(12) United States Patent
Wang

(10) Patent No.: US 7,706,025 B2
(45) Date of Patent: *Apr. 27, 2010

(54) MOIRÉ-BASED AUTO-STEREOSCOPIC WATERMARKS

(75) Inventor: Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 809 days.

This patent is subject to a terminal disclaimer.

(21) Appl. No.: 11/263,368

(22) Filed: Oct. 31, 2005

(65) Prior Publication Data

US 2007/0102921 A1 May 10, 2007

(51) Int. Cl.
*H04N 1/40* (2006.01)
(52) U.S. Cl. .................. 358/3.28; 358/450; 283/72; 283/93; 283/113
(58) Field of Classification Search .......... 358/3.06; 359/376; 428/156, 167, 187, 203, 212, 201, 428/329, 195.1, 318.4; 524/539; 156/85
See application file for complete search history.

(56) References Cited

U.S. PATENT DOCUMENTS

| | | | | |
|---|---|---|---|---|
| 4,158,481 | A * | 6/1979 | Hoyer | 359/478 |
| 5,866,233 | A * | 2/1999 | Oshima et al. | 428/172 |
| 6,329,040 | B1 * | 12/2001 | Oshima et al. | 428/156 |
| 6,575,564 | B1 * | 6/2003 | Tsuchiya et al. | 347/70 |
| 6,778,295 | B1 * | 8/2004 | Babulski | 358/1.9 |
| 7,058,202 | B2 * | 6/2006 | Amidror | 382/100 |
| 7,286,682 | B1 * | 10/2007 | Sharma et al. | 382/100 |
| 7,366,301 | B2 * | 4/2008 | Huang et al. | 380/51 |
| 2002/0117845 | A1 * | 8/2002 | Ahlers et al. | 283/72 |
| 2003/0030271 | A1 * | 2/2003 | Wicker | 283/113 |

OTHER PUBLICATIONS

U.S. Appl. No. 11/263,190, filed Oct. 31, 2005, entitled "Moiré-Based Auto-Stereoscopic Images by Duplex Printing on Transparencies".
U.S. Appl. No. 11/263,142, filed Oct. 31, 2005, entitled "Moiré-Based Auto-Stereoscopic Enhancement of Images for Duplex Rendering on Transparencies".

* cited by examiner

*Primary Examiner*—Mark K Zimmerman
*Assistant Examiner*—Dung D Tran
(74) *Attorney, Agent, or Firm*—Philip E. Blair; Philip Blair & Associates

(57) ABSTRACT

Provided herein are teachings directed to the creation of moiré-based auto-stereoscopic watermarks in rendered images. By choosing different halftone structures, which differ by having different spatial frequencies for each of two delineated partitions in an image, it becomes possible to embed arbitrary binary patterns into printed documents as digital watermarks. The invisible watermarks become moiré auto-stereoscopic images when the prints are viewed through an overlaid transparency "decoder" suitably prepared by virtue of being rendered with a uniform halftone structure having the correct special frequency in relationship with the partition frequencies employed in the printed document.

29 Claims, 9 Drawing Sheets

MOIRÉ-BASED AUTO-STEREOSCOPIC WATERMARKS

CROSS-REFERENCE TO RELATED APPLICATIONS

Attention is directed to copending applications: U.S. application Ser. No. 11/263,190, entitled "MOIRÉ-BASED AUTO-STEREOSCOPIC IMAGES BY DUPLEX PRINTING ON TRANSPARENCIES"; and U.S. application Ser. No. 11/263,142, entitled "MOIRÉ-BASED AUTO-STEREOSCOPIC ENHANCEMENT OF IMAGES FOR DUPLEX RENDERING ON TRANSPARENCIES". The disclosure found in each of these copending applications is hereby incorporated by reference in its entirety.

BACKGROUND AND SUMMARY

The teachings presented herein relate generally to stereoscopic images. More specifically, the teachings presented herein relate to the creation of moiré-based auto-stereoscopic watermarks in rendered images.

The principle of stereoscopic vision is well understood. At the most basic level, each of the viewer's two eyes must perceive the subject matter to be viewed from a slightly different perspective. That is to say that, although the differences are generally quite subtle, each eye receives a different image.

Several methods are commonly used to produce stereoscopic images. On the one hand, these include the use of direction selective screens onto which two or more images may be projected simultaneously. Depending on the viewer's position, a different image may be observed by each eye. Where only two images are required, it is common practice to use polarizing techniques. Each image is projected with a characteristic polarization and when viewing through complementary polarizing viewing spectacles, each eye only sees the picture intended for its reception.

Most existing methods to view printed stereoscopic images require either special glasses (colored or polarized) or lenticular lenses. The stereogram may be the one exception which does not need any special viewing aid; however, many people find that it is very difficult and uncomfortable to see the hidden stereo image. Lenticular lenses are common but incur some additional expense and complexity as they require an embossed transparent material for operation.

With most current digital watermark technologies, to retrieve embedded watermark information from printed documents requires scanning and processing by a scanner and a computer. It is desirable to provide a simple and quick way to provide invisible watermarks embedded in documents. It is desirable to provide these invisible watermarks with means that will quickly make them visible in a given print item, where an observer is provided only with a simple overlay without the need for lenticular or other special lenses, and for which this means is readily and inexpensively generated with common materials using conventional printing apparatus.

Disclosed in embodiments herein is a moiré-based auto-stereoscopic watermark system. The watermark system comprises a substantially transparent substrate having a first side. As applied to and placed on the first side of the substantially transparent substrate is a first side applied marking material of periodic structure having a first frequency. The watermark system further comprises a second substrate. As applied to the second substrate is a second side applied marking material which further comprises a first partition and a second partition, the first partition having a periodic structure at a second frequency, that second frequency being related to but some delta away from the first frequency. The second partition has a periodic structure at a third frequency, that third frequency being related to but some delta away from the first frequency, such that when the substantially transparent substrate is placed upon the second substrate in substantial alignment with the second side applied marking material, a moiré-based auto-stereoscopic watermark image is evident to an observer.

Further disclosed in embodiments herein is an alternate moiré-based auto-stereoscopic watermark. The watermark includes a substantially transparent substrate having a first side applied marking material having a periodic structure at a first frequency, as applied to and placed on at least one side of the substantially transparent substrate. The watermark also includes an additional substrate having a selected side, and a second side applied marking material as applied to the selected side of the additional substrate. The second side applied marking material further comprises a first partition and a second partition, the first partition having a periodic structure at a second frequency, that second frequency being related to but some delta away from the first frequency, and the second partition having a periodic structure at the first frequency. The above are arranged such that when the substantially transparent substrate is placed upon the additional substrate in substantial alignment with the second side applied marking material a moiré-based auto-stereoscopic watermark image is made evident to an observer.

Further disclosed in embodiments herein is a method for providing a moiré-based auto-stereoscopic watermark imaging system, by applying marking material with a halftone periodic structure at a first frequency to a substantially transparent substrate. The method further comprises applying marking material within a first partition on a selected side of a second substrate with a halftone periodic structure at a second frequency, that second frequency being related to but some delta away from the first frequency. The method also comprises applying marking material within a second partition on the selected side of the second substrate with a halftone periodic structure at a third frequency, that third frequency being related to but some delta away from the first frequency. This is followed by placing the substantially transparent substrate upon the second substrate in substantial alignment with the selected side applied marking materials such that a moiré-based auto-stereoscopic watermark image is evident to an observer.

DETAILED DESCRIPTION

A methodology is herein taught using duplex printing on transparencies to create auto-stereoscopic images viewed in a "see-through" manner. By choosing different halftone structures for each of the two sides of a transparency, a moiré pattern resulting due to halftone overlapping can be observed. When the transparency is viewed at different angles (as is inherent with the distance from the left eye to the right eye of an individual observer), a very small lateral shift occurs between the front-side and the back-side prints due to the thickness of the transparency and would not be otherwise normally noticeable. However, the corresponding resulting moiré shift can be much greater than the above-mentioned lateral shift and can also be in a different direction. As a result, the moiré result is apparently visually perceived as located in the space in front of or behind the transparency. For example, using an ordinary transparency with an approximately 100 micron thickness as is typical for laser printers, the appearance of perceived depth from the resulting moiré can be as large as hundred times the thickness of the transparency, or about 10 mm deep. The method provided herein teaches how to select halftone frequencies and estimate the resulting appearance of depth for the corresponding resulting moirés. An example embodiment is taught below showing how moiré images with two different depths are created. There are many possible applications for this method, such as in security printing, for advertising novelties, or in the enhancement of graphics content.

A further methodology is herein taught directed to the creation of moiré-based auto-stereoscopic watermarks in rendered images. By choosing different halftone structures, which differ by having different spatial frequencies for each of two delineated partitions in an image, it becomes possible to embed arbitrary binary patterns into printed documents as digital watermarks. The invisible watermarks become moiré auto-stereoscopic images when the prints are viewed through an overlaid transparency "decoder" suitably prepared by virtue of being rendered with a uniform halftone structure having the correct special frequency in relationship with the partition frequencies employed in the printed document.

Figure 1:
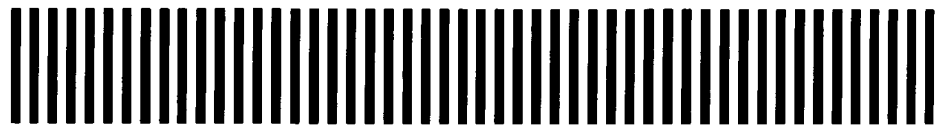
FIG. 1 shows a line halftone with spatial frequency f1=16 LPI.
Figure 2:
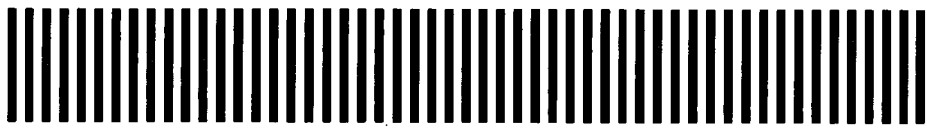
FIG. 2 shows line halftones with spatial frequencies f2=17 LPI.
Figure 3:
FIG. 3 shows an overlapping of the two line halftones f1 & f2 from FIGS. 1 & 2, one atop the other.

When two different halftones with similar spatial frequencies overlap each other, a moiré pattern may be observed. For example, FIGS. 1 and 2 are two line halftones with spatial frequencies f1=16 LPI (lines-per-inch) and f2=17 LPI, respectively. By overlapping the two halftones together, a moiré pattern, as shown in FIG. 3, can be observed. It is well known by those skilled in the art, that moiré frequency is equal to the difference or delta of the two line halftones, i.e., $\Delta f = f2-f1$. For the current example as provided in FIG. 3, $\Delta f = 1$ LPI.

Figure 4:
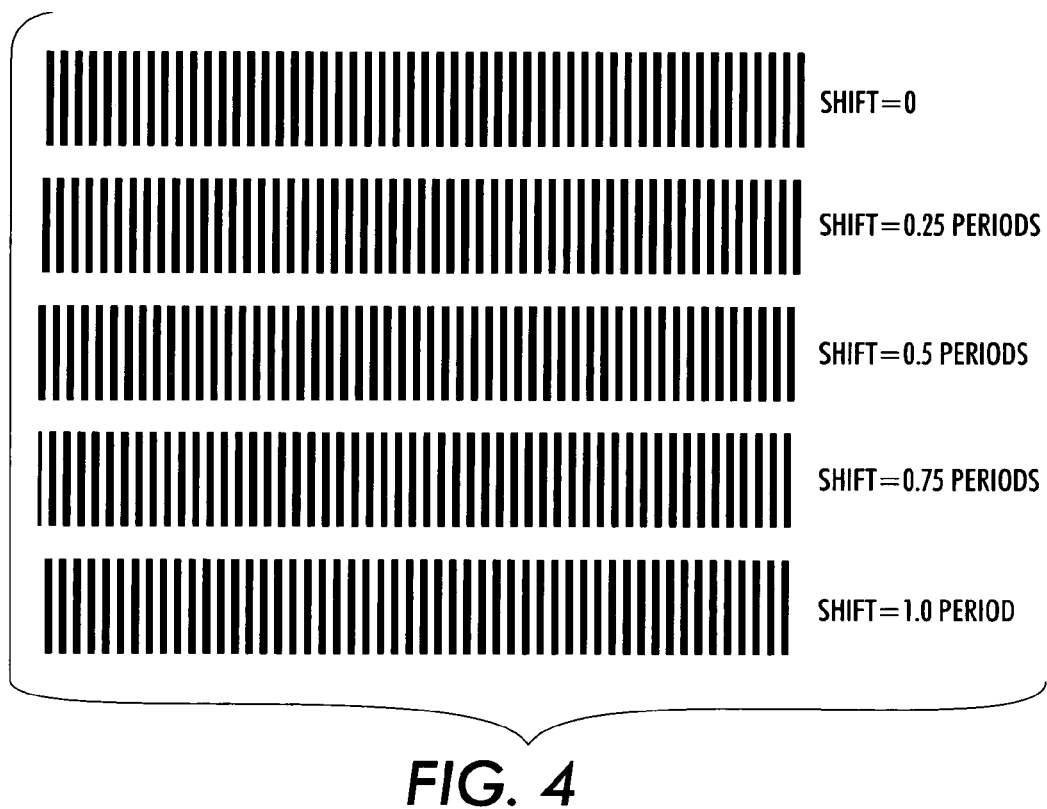
FIG. 4 shows the lateral shifting of the line halftone f2 from FIG. 2.

If one of the two line halftones is moved laterally with respect to another, the moiré also moves laterally but in different speed. To demonstrate the effect of a relative movement of two overlapped halftones, the line halftone f2 in FIG. 1 is shifted toward left in a step equal to a quarter of the period of the line halftone, or $0.25 \times 1/17$ inches. FIG. 4 shows the shift sequence of the line halftone f2 after four steps. The total lateral shift provided there is equal to $1/17$ inches.

Figure 5:
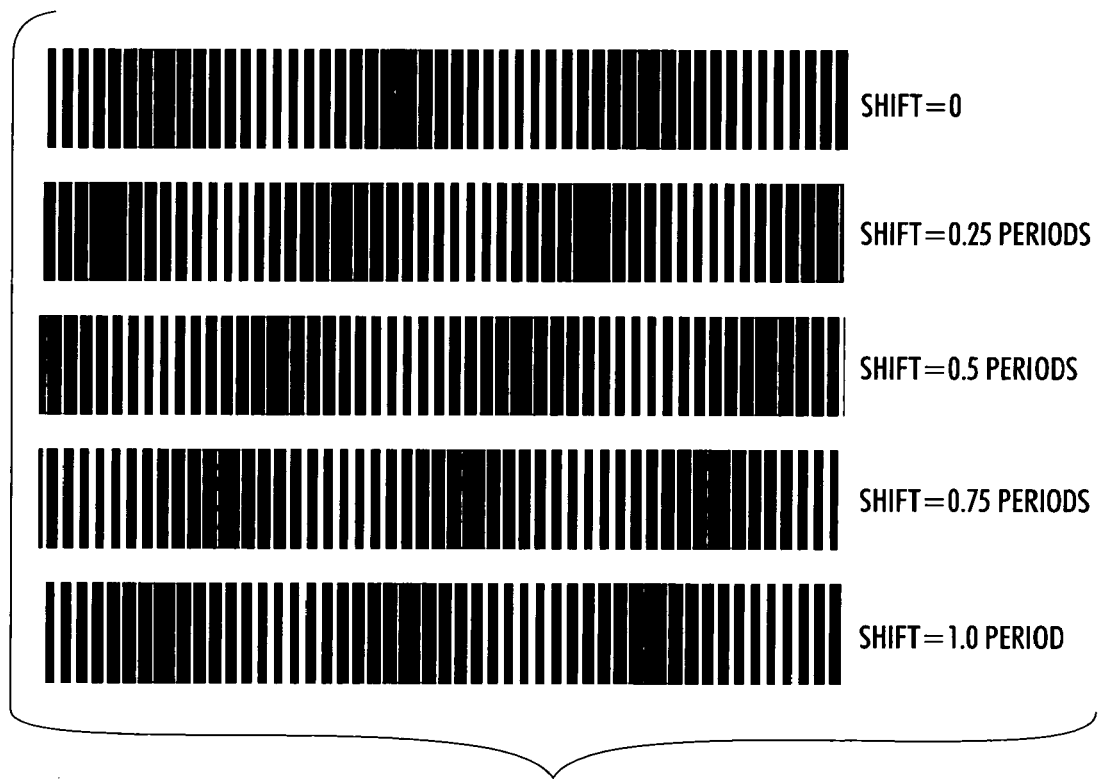
FIG. 5 shows the Moiré shift resultant from the overlap of f1 upon the lateral shift of f2 from FIG. 4.
Figure 6:
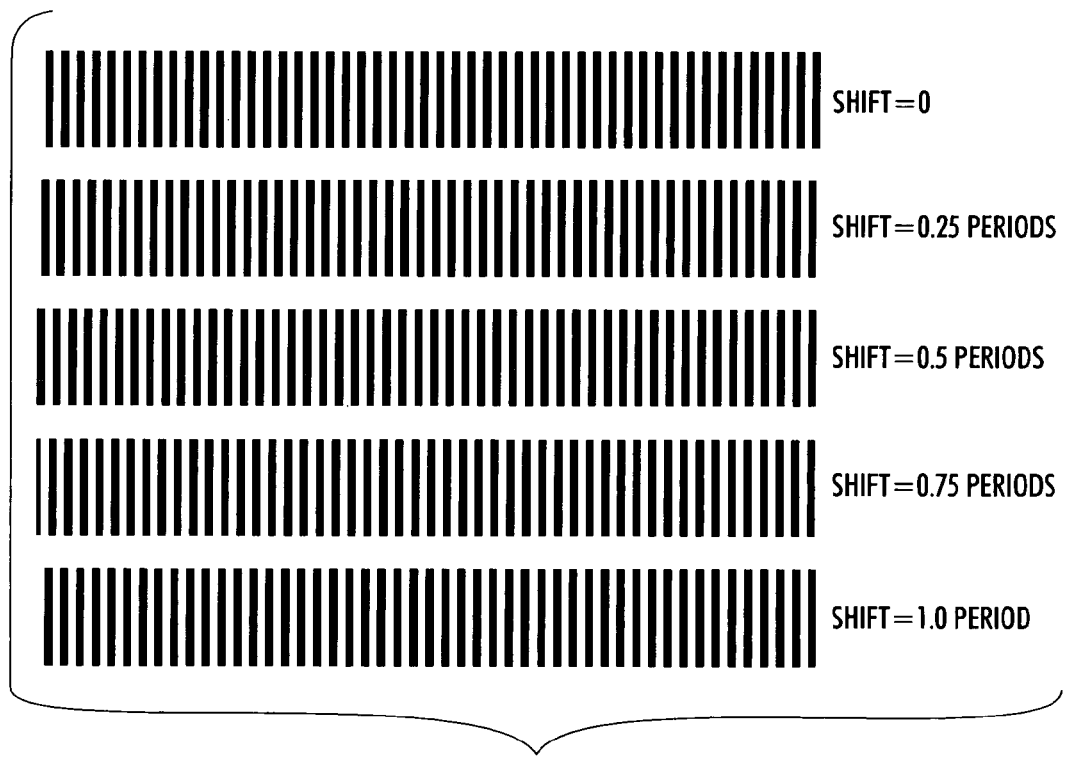
FIG. 6 shows the lateral shifting of the line halftone f1 from FIG. 1.
Figure 7:
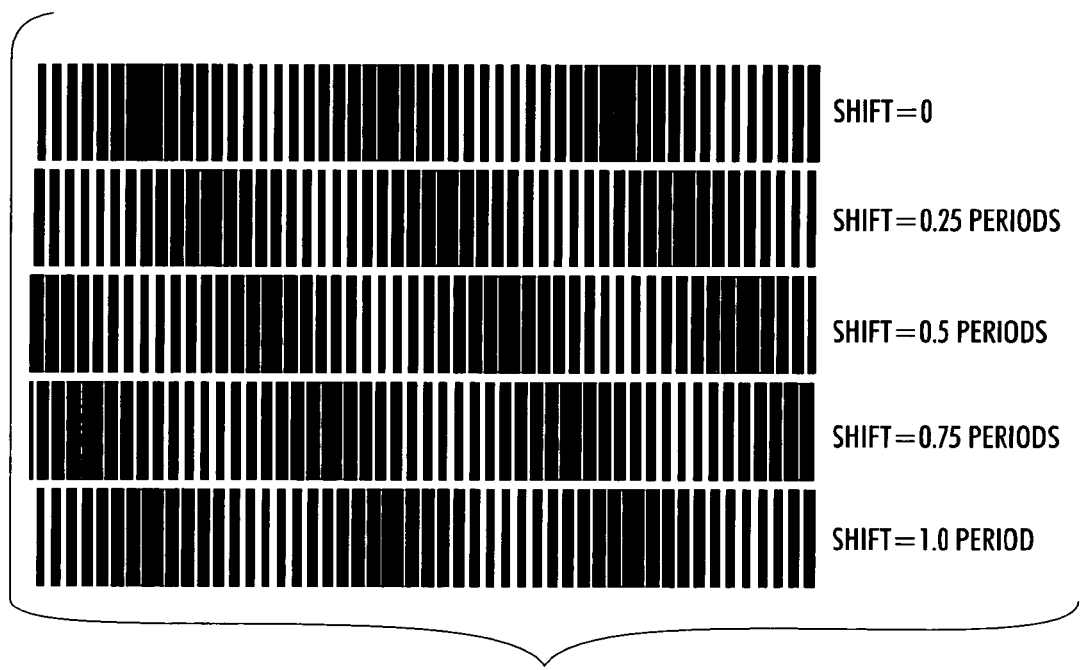
FIG. 7 shows the Moiré shift resultant from the overlap of f2 upon the lateral shift of f1 from FIG. 6.

By overlapping the shifted line halftone f2 to the halftone f1, one can see that the moiré is also shifted toward left in this case as depicted in FIG. 5 and the total lateral shift of the moiré after four steps is exactly equal to the period of the moiré, or one inch. It is also not difficult to see that the moiré moves in an opposite direction, if the lateral shift happens to the line halftone f1, when f2>f1. FIGS. 6 and 7 similarly demonstrate the result with a lateral shift of f1.

For the current analysis, we may assume that the moiré frequency is much, much less than the halftone special frequency or: $\Delta f \ll f$, where $f=(f1+f2)/2$ and $\Delta f=f2-f1$. Therefore, ignoring small differences in calculation, we may summarize the two cases of moiré shift in FIGS. 5 and 7 as follows: when the two overlapped halftone lines, f1 and f2, have a relative lateral shift, the moiré always moves in the direction defined by the movement of f2, the halftone with a higher spatial frequency. The moiré moves M times faster than the relative movement between f1 and f2, or M may be expressed as given by:

$$M = f/\Delta f, \text{ where } f=(f1+f2)/2 \text{ and } \Delta f=f2-f1. \quad (1)$$

Figure 8:
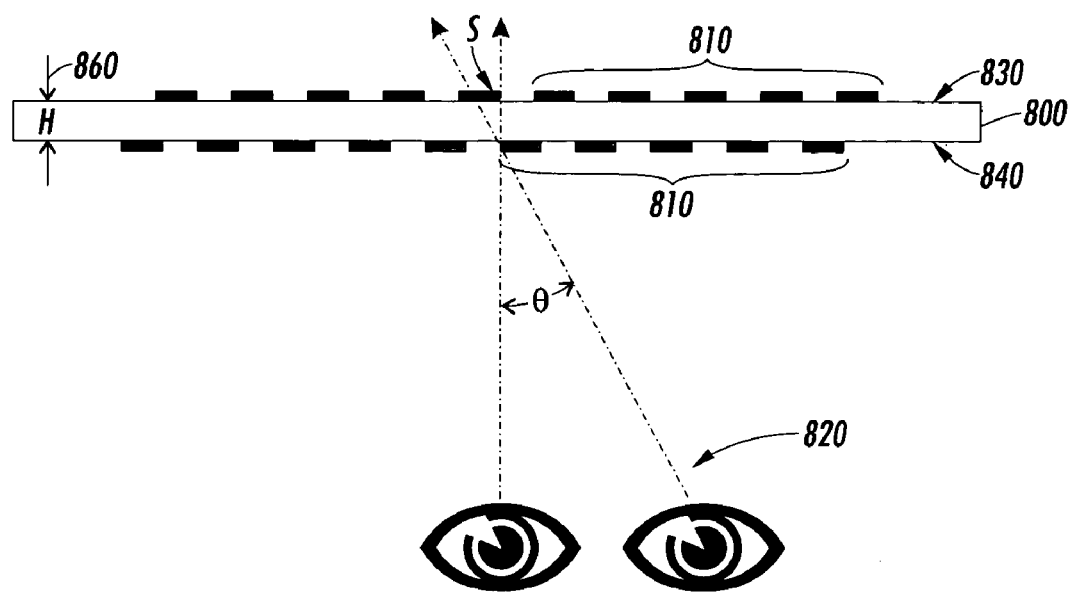
FIG. 8 shows as schematically depicted the eyes of an observer as viewing a transparency provided with duplex printing thereupon.

In FIG. 8 there is schematically depicted the eyes of an observer as viewing a transparency provided with duplex printing thereupon. When a transparent substrate 800 as provided with print 810 on both transparency sides 830 & 840 is viewed in a such "see-through" matter, each of the two individual eyes 820 of an observer are seeing slightly different overlapping images as provided by the two sides of the transparency 830 & 840. Due to the difference of viewing angles, θ, between each of the two eyes, and the finite thickness of the transparency 860, or "H", as compared to the image seen by the left eye, the right eye sees the print on the back side of the transparency with a small lateral shift, "S", with respect to the print on the front side. The shift "S" is approximately equal to: S=θH; and gives the appearance of shifting to the right in this example. Since a normal transparency 800 is only about 100-micron thick and θ, the difference of viewing angles by two eyes 820, is typically less than 0.5 degrees at a normal reading distance, the lateral shift "S" is too small to create any stereoscopic view for most such duplex prints.

However, if the two line halftones depicted in FIGS. 1 and 2 as provided with different spatial frequencies, f1 and f2, and are printed on two sides of a transparency respectively, a moiré will be observed clearly in a "see-through" viewing configuration. Because of the stereoscopic view of the two-sided print due to the thickness of the transparency, the resultant moiré seen by the two eyes 820 of the observer is different. If the line halftone with a higher spatial frequency f2 is printed on the back side 830 and the halftone with a lower frequency f1 is on the front side 840, the moiré is moving towards to the right when the viewing is changed from left to right. As described in above, the shift of the moiré is much greater than that due to "S" (lateral shift), the relative lateral shift of the two-side prints. Indeed, it is magnified by a factor M, as given by Equation 1 above: $M=f/\Delta f$, where $f=(f1+f2)/2$ and $\Delta f=f2-f1$. Therefore, the moiré appears as if it were printed on the back side of a much thicker transparency. In other words, the stereoscopic view of the overlapping of the two line halftones creates a stereo moiré image located in the space behind the transparency at a distance approximately M times the thickness of the transparency "H". If the same transparency is viewed with the line halftone f2 on the front side and f1 on the back side, the moiré will appears as located in the space in front of the transparency and also at a distance approximately equal to M×H. With current printing technologies it is not difficult to generate halftone line structures with a fairly large frequency range, so the magnification M can be easily varied between zero up to a hundred. Hence, by choosing right combinations of f1 and f2 for the duplex printing, it is possible to create moiré-based auto-stereoscopic images with a depth range in the order of a few millimeters.

In one example a transparency shows a stereoscopic moiré image having two depth levels provided by using the technique described above. On one side of the transparency is provided a uniform line halftone with a spatial frequency of 120 LPI as printed. On the other side, the printing consists of two partitions: what is to be perceived as the background is printed using a line halftone with a 123 LPI spatial frequency, while a logo image partition is printed using a line halftone with a 117 LPI frequency. The spatial frequency difference between the line halftones on two sides is approximately equal to 3 LPI, thus, the corresponding shift-magnification factor M, as given by Equation 1 above, is about 40. Since the moiré produced by the two partition print images as visually located appear in two spatial planes as separated by the transparency, the total depth of this moiré image is about 80 H, where "H" is the thickness of the transparency, and so is about 100 microns. Thus is yielded a moiré stereoscopic pattern clearly discernable to the human eye with out aid of lenses or other means.

The effective limitation to this magnification factor M, as given by Equation 1 above is constrained by two things. First is a given selected printer provides technology constraints as to the maximum print system frequency resolution, which at present is typically 300 LPI. This limits the upper moiré frequency limit. The second constraint is the human visual response to low frequency moiré as where low frequency beats (i.e. large $\Delta f$), if too low, will simply be right off the page.

Figure 9:
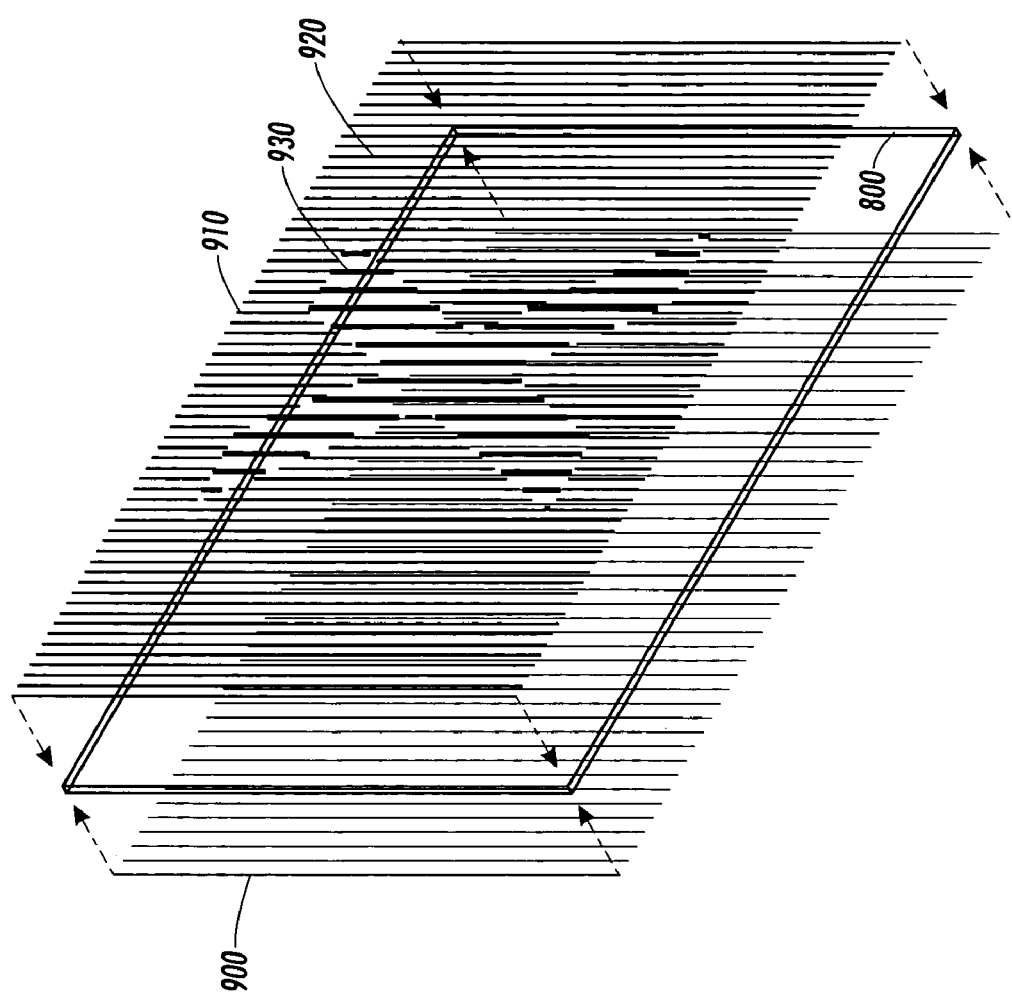
FIG. 9 shows an exploded-view schematical depiction of one possible exemplary embodiment.

FIG. 9 provides an exploded view, schematical depiction of one exemplary embodiment. Here transparent substrate 800 is provided with a front-side applied marking material of periodic structure 900, as well as, a back-side applied marking material of periodic structure 910. In this depiction, for the sake of explanation, the applied marking materials are shown as planes standing free of the substrate. However, in at least one embodiment, these applied marking materials of periodic structure are applied directly upon the transparent substrate's front and back sides, either by duplex printing or by way of conventional two pass printing. In another embodiment, one of the two applied planes of marking materials of periodic structure is alternatively applied to a second substrate instead of the transparent substrate 800 and that second substrate is then brought into close proximity and substantial alignment with the transparent substrate 800. Additional transparent substrates may also be placed between the transparent substrate 800 and the second substrate to effectuate a larger "H" and thus increase the perceived depth for an observer 820 as explained above.

On one side of the transparent substrate 800, the applied marking material of periodic structure 900 is provided by printing a uniform line halftone with a selected median spatial frequency. On the other side, for the applied marking material of periodic structure 910 there is provided by printing, two partitions: that which is to be perceived as the background partition 920 in this embodiment is printed using a line halftone with spatial frequency equal to the median plus some delta or difference in frequency amount (½ $\Delta f$); while the desired image partition 930 is printed using a line halftone with a spatial frequency equal to the median minus the delta frequency amount. The spatial frequency difference between the line halftones on two sides creates a corresponding shift-magnification factor M. The moiré produced by the two print partitions 920 and 930 image as visually located in appearance in two separate spatial planes as separated by the transparency, with an effective amplified total depth as equal to the shift-magnification factor M times the thickness of the transparency. Thus is yielded a moiré stereoscopic pattern for the desired image partition 930 as clearly discernable to the human eye with out aid of lenses or other means.

As will be evident to those skilled in the art, transparent substrate 800 may be plastic, glass, Plexiglas, etc. as well as the typical presentation transparency slide intended for usage by print systems as employed in combination with overhead projectors. Indeed transparent substrate 800 may be only partially transparent or translucent, though the effect will be impeded. As should be clear from the above teachings thicker substrates such as glass will yield a more pronounced effect. As will also be obvious to those skilled in the art, the applied marking materials as discussed above may include liquid-based, toner-based, wax-based, inks or powders or solids, as well as paint or other pigment based materials.

Figure 10:
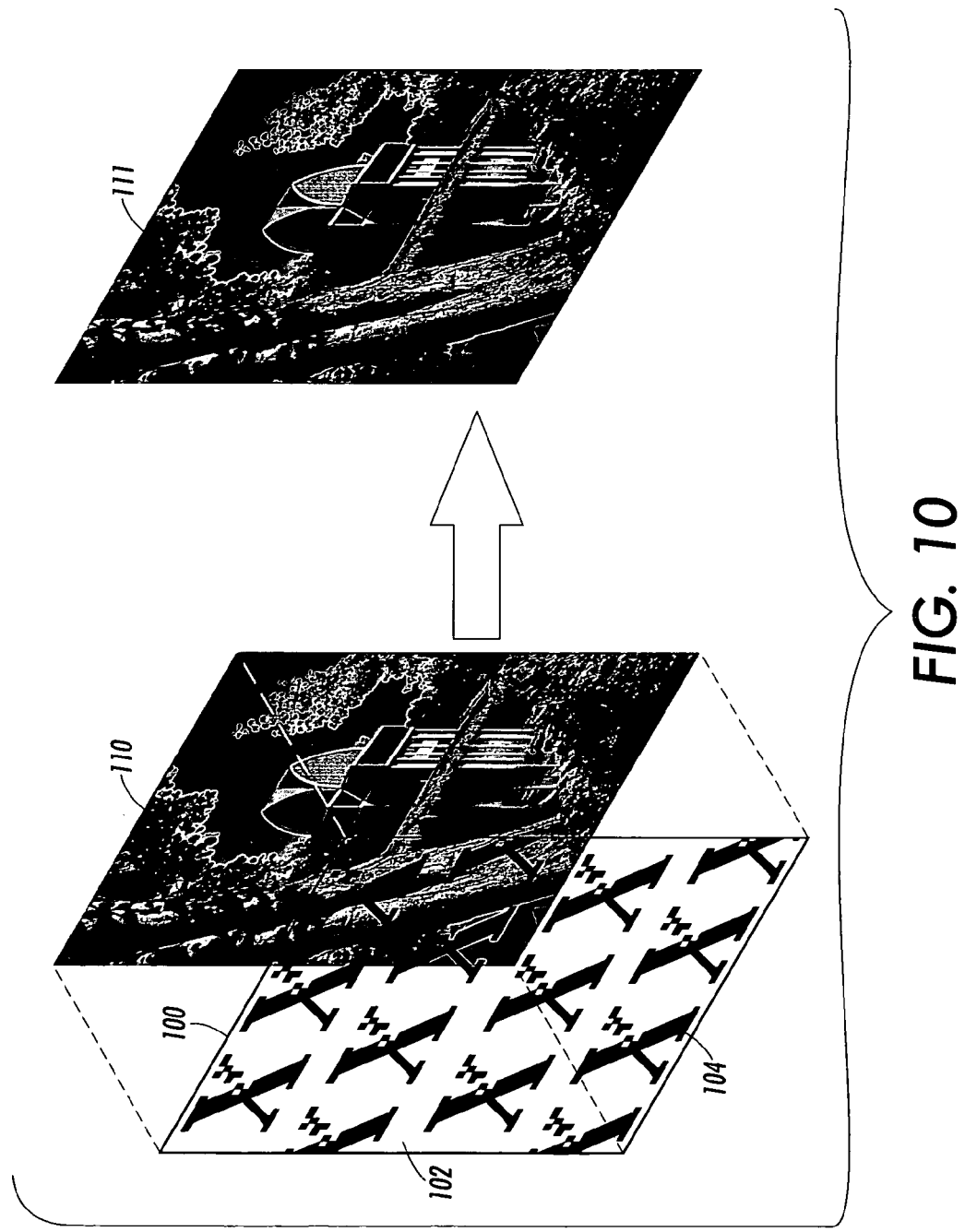
FIG. 10 schematically depicts the superimposition of a watermark image into an image of interest to yield moiré-based auto-stereoscopic printed page.

The teachings provided above may also be so employed so as to apply the two line screens of different frequencies, f1 and f2, to embed watermarks into halftone rendered prints. FIG. 10 schematically depicts such a superimposition of a watermark image into an image of interest to yield moiré-based auto-stereoscopic printed page. In this example, the flat binary desired watermark image pattern 100 shown in FIG. 10 specifies the two partitions for the usage of different frequency halftone screens: the white partition 102 is for f1, the first line screen, and the black partition 104, for f2, the second. When the input image 110, as shown also in FIG. 10, is halftoned, one of the two line screens is chosen at a given time as based on the binary value of the watermark pattern at the corresponding location of desired watermark image pattern 100. The rendered halftone output 111 can be printed on a normal paper as is depicted in FIG. 11.

Figure 11:
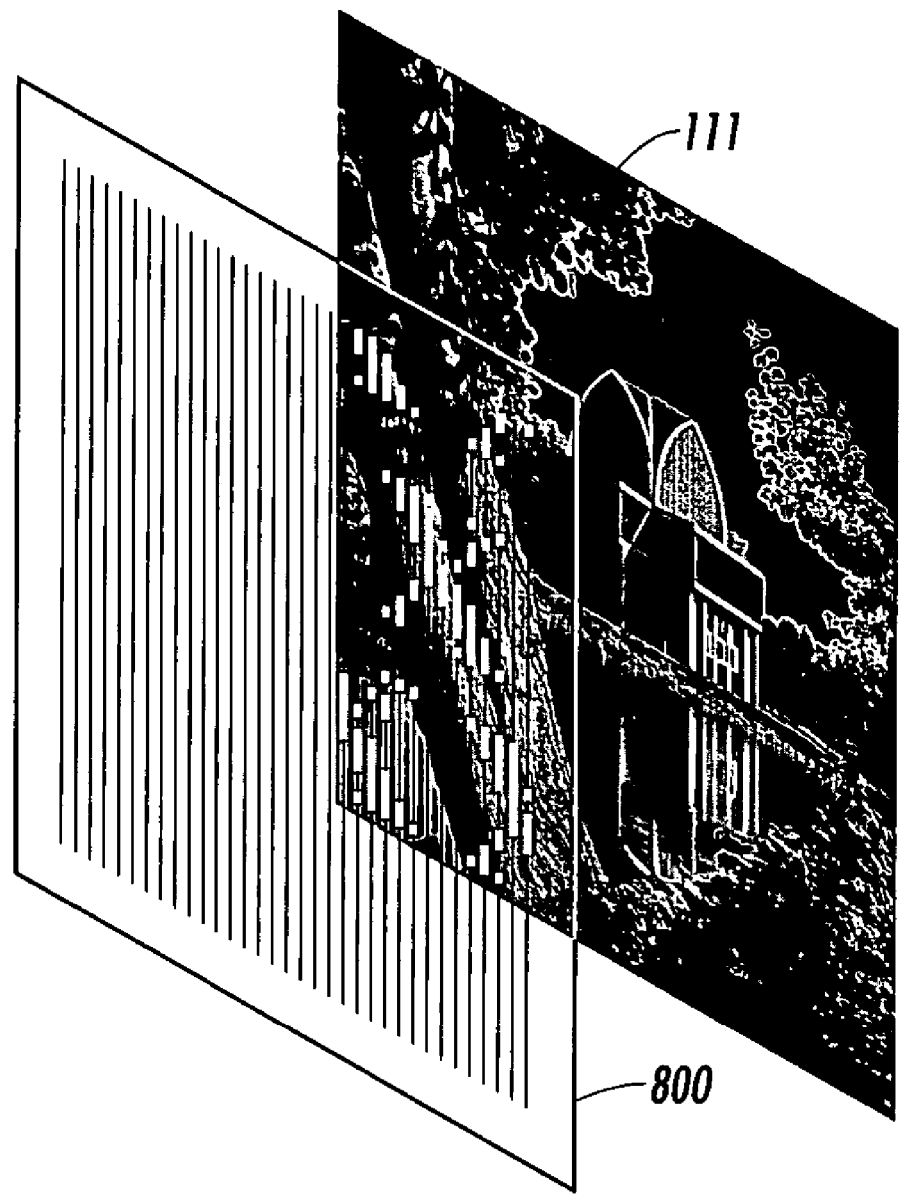
FIG. 11 depicts the manual overlay of a suitably prepared printed transparency upon the moirébased-auto-stereoscopic printed page of FIG. 10.

FIG. 11 depicts the manual overlay of a suitably prepared printed transparency 800 upon the moiré-based auto-stereoscopic printed page 111 of FIG. 10. Separately prepared, a uniform halftone line structure with halftone frequency f3 is printed on a transparency 800 and is used as a "decoder" overlay for the purpose of revealing the moiré watermark. To view the embedded watermarks one places the transparency 800 on the top of the printed image 111, with the printed side of the transparency facing up, so the two printed halftones, one on the transparency 800 and another one on the paper 111, are separated by at least the thickness of the transparency. Similar to the duplex printing on a single transparency 800 described previously above, by properly choosing the line frequencies f1 and f2 for the image 111 and the line frequency f3 for the transparency 800, stereoscopic moirés images are revealed. This can be observed as is depicted in FIG. 11 within the area of intersection between transparency 800 and rendered image 111.

Of course, for this example embodiment, the transparency 800 needs to be so placed that the lines on both prints 800 and 111 are aligned to the same angle to obtain the desired moiré patterns. However, the requirement is quite relaxed, requiring alignment only to within a few degrees. As may be readily observed when the example is actually at hand, is the fact that slightly different angles will yield tilted moirés, but will never-the-less provide the same effective stereoscopic effect.

For the example embodiment shown in FIG. 10 the choice of f2=f3=117 LPI, and f1=120 LPI, was made. Thus, the noticeable moirés with a 3-LPI frequency delta due to the difference between f1 and f3 are observed only in the area specified by the white partition of the binary watermark pattern shown in FIG. 10. The moirés appear as located a few millimeters behind the paper surface, as calculated and discussed above, while the logo patterns appear to be right on the paper surface in this example embodiment. The final result is that the embedded watermark patterns are retrieved as viewable vivid 3-D logo patterns.

Above choice of those line frequencies is only one example. Other frequency combinations may also be used for different 3-D appearances. Furthermore, moirés can be also obtained by overlapping two halftone patterns using two cluster screens with slightly different frequencies and/or angles, so, as will be understood by one skilled in the art, the above teachings may also applied to cases with cluster screens.

Doubtless those skilled in the art will recognize may applications for the teaching provided herein. In particular is in the authentication of print items including tickets, coupons, diplomas and certificates. Further application may be found where the normal course of physical arrangement provides a transparent layer over a printed layer. For example where a package with print thereupon is wrapped with a suitably rendered transparent wrap over it. Another example would be book slip covers further provided with an additional suitably rendered transparent cover wrap, such that auto-stereoscopic moiré images are incorporated into the artistic design appearing on the cover.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A moiré-based auto-stereoscopic digital watermark system, comprising:
    a substantially transparent substrate having a first side;
    a first substrate applied marking material having a uniform periodic structure at a first frequency, as applied to and placed on the first side of the substantially transparent substrate to thereby provide a decoder overlay;
    a second substrate and,
    a second substrate applied marking material as applied to a surface of the second substrate, the second substrate applied marking material further comprising an image of interest with a first contiguous partition and a second contiguous partition that is separate from the first partition,
    the first contiguous partition having a first periodic structure at a second frequency, that second frequency being related to but some delta away from the first frequency, and
    the second contiguous partition that is distinct from the first contiguous partition and having a second periodic structure at a third frequency, the second periodic structure being substantially parallel to the first periodic structure, that third frequency being related to and a first delta away from the first frequency and a second delta way from the second frequency where the first delta is different than the second delta, such that when the decoder overlay is placed first side facing up upon the second substrate in substantial alignment with the second substrate applied marking material, a moiré-based auto-stereoscopic digital watermark image comprising both the first contiguous partition and the second contiguous partition is evident, wherein both the first contiguous partition and the second contiguous partition of the moiré-based auto-stereoscopic digital watermark image are simultaneously evident as a moiré-based auto-stereoscopic digital watermark image to an observer.

2. The watermark system of claim 1 wherein the periodic structure is a line screen.

3. The watermark system of claim 1 wherein the substantially transparent substrate is a typical presentation transparency slide as intended for usage by print systems and employed in combination with overhead projectors.

4. The watermark system of claim 1 wherein the substantially transparent substrate is glass.

5. The watermark system of claim 1 wherein the substantially transparent substrate is plastic.

6. The watermark system of claim 1 wherein the substantially transparent substrate is Plexiglas.

7. A moiré-based auto-stereoscopic digital watermark, comprising:
    a substantially transparent substrate;
    a first substrate applied marking material having a uniform periodic structure at a first frequency, as applied to and placed on at least one side of the substantially transparent substrate to provide a decoder overlay;
    an additional substrate having a selected side; and,
    a second substrate applied marking material as applied to the selected side of the additional substrate, the second substrate applied marking material further comprising an image of interest with a first contiguous partition and a second contiguous partition that is separate from the first partition,
    the first contiguous partition having a first periodic structure at a second frequency, that second frequency being related to but some delta away from the first frequency, and
    the second contiguous partition that is distinct from the first contiguous partition and having a second periodic structure at the first frequency, the second periodic structure being substantially parallel to the first periodic structure, such that when the decoder overlay is placed upon the additional substrate in substantial alignment with the second substrate applied marking material a moiré-based auto-stereoscopic digital watermark image comprising the first partition is made evident to an observer while the second partition appears to be on the selected side of the additional substrate, wherein both the first contiguous partition and the second contiguous partition are simultaneously evident as a moiré-based auto-stereoscopic digital watermark image.

8. The watermark of claim 7 wherein the additional substrate is opaque.

9. The watermark of claim 7 wherein the additional substrate is transparent.

10. The watermark of claim 7 wherein the additional substrate is translucent.

11. The watermark of claim 7 wherein the substantially transparent substrate is translucent.

12. The watermark of claim 7 wherein the additional substrate is brought into close proximity and substantial alignment with the substantially transparent substrate.

13. The watermark of claim 12 further comprising a third substrate placed between the substantially transparent substrate and the additional substrate as brought into close proximity and substantial alignment with the substantially transparent substrate and additional substrate.

14. The watermark of claim 7 wherein the applied marking material is wax-based.

15. The watermark of claim 7 wherein the applied marking material is paint.

16. The watermark of claim 7 wherein the applied marking material is liquid-based.

17. The watermark of claim 16 wherein the applied marking material is shellac.

18. The watermark of claim 7 wherein the periodic structure is a line screen halftone.

19. The watermark of claim 18 wherein the first frequency is 120 LPI, the second frequency is 117 LPI.

20. A method for providing a moiré-based auto-stereoscopic digital watermark imaging system, comprising:

applying marking material with a uniform halftone periodic structure at a first frequency to a substantially transparent substrate to provide a decoder overlay;

applying marking material within a first contiguous partition on a selected side of a second substrate with a first halftone periodic structure at a second frequency, that second frequency being related to but some delta away from the first frequency;

applying marking material within a second contiguous partition that is distinct from the first contiguous partition and on the selected side of the second substrate, the second contiguous partition having a second halftone periodic structure at a third frequency, the second periodic structure being substantially parallel to the first periodic structure, that third frequency being related to and a first delta away from the first frequency and a second delta way from the second frequency; and, placing the decoder overlay upon the second substrate in substantial alignment with the selected side applied marking materials such that a moiré-based auto-stereoscopic digital watermark image comprising both the first contiguous partition and the second contiguous partition is evident, wherein both the first contiguous partition and the second contiguous partition of the moiré-based auto-stereoscopic digital watermark image are simultaneously evident as a moiré-based auto-stereoscopic digital watermark image to an observer.

21. The method for a watermark system of claim 20 wherein the halftone periodic structure is a line screen.

22. The method for a watermark system of claim 20 wherein the substantially transparent substrate is a typical presentation transparency slide as intended for usage by print systems and employed in combination with overhead projectors.

23. The method for a watermark system of claim 20 wherein the substantially transparent substrate is glass.

24. The method for a watermark system of claim 20 wherein the substantially transparent substrate is plastic.

25. The method for a watermark system of claim 20 wherein the substantially transparent substrate is Plexiglas.

26. The method for a watermark system of claim 21 wherein the first frequency is 120 LPI, the second frequency is 123 LPI and the third frequency is 117 LPI.

27. The method for a watermark system of claim 21 wherein the first frequency is 120 LPI, the second frequency is 123 LPI and the third frequency is 120 LPI.

28. The watermark system of claim 1, further comprising a binary desired watermark image pattern, wherein the first partition is specified by a white area and the second partition is specified by a dark area, wherein the second substrate applied marking material is created by using the first periodic structure at the second frequency in areas corresponding to the white area of the binary desired watermark image pattern and by using the second periodic structure at the third frequency in areas corresponding to the dark area of the binary desired watermark image pattern.

29. The method for a watermark system of claim 20, wherein applying marking material within the first partition comprises using the halftone structure at the second frequency in areas corresponding to a white area of a binary desired watermark image pattern, and wherein applying marking material within the second partition comprises by using the halftone periodic structure at the third frequency in areas corresponding to the dark area of the binary desired watermark image pattern.

* * * * *